UNITED STATES PATENT OFFICE.

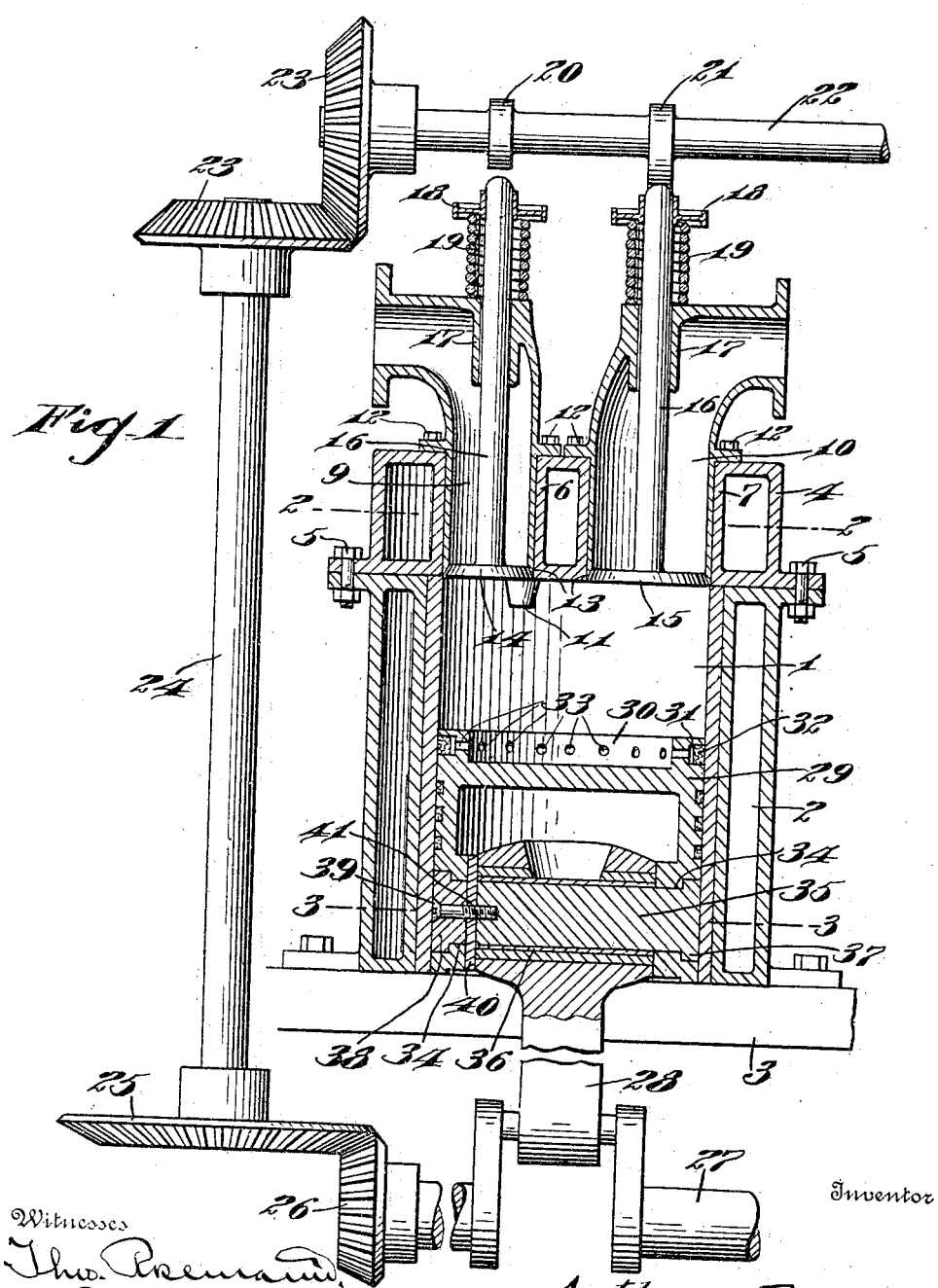

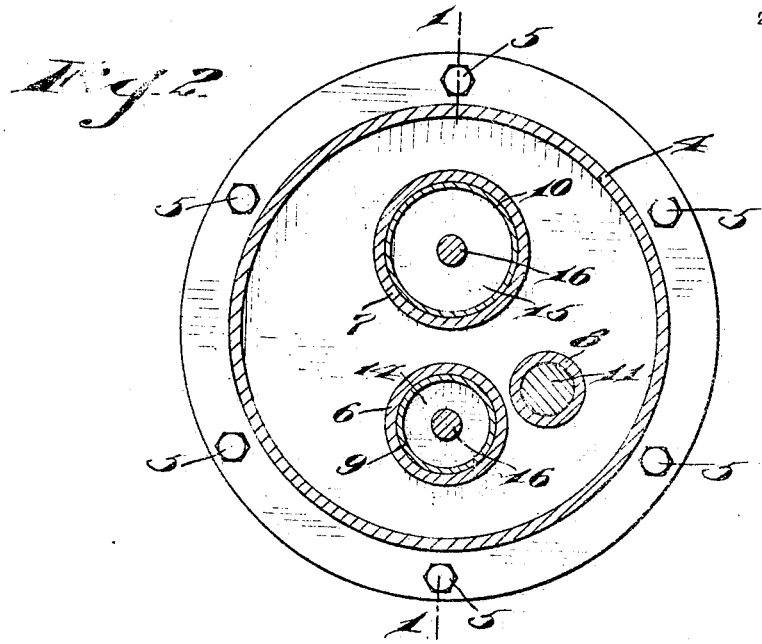
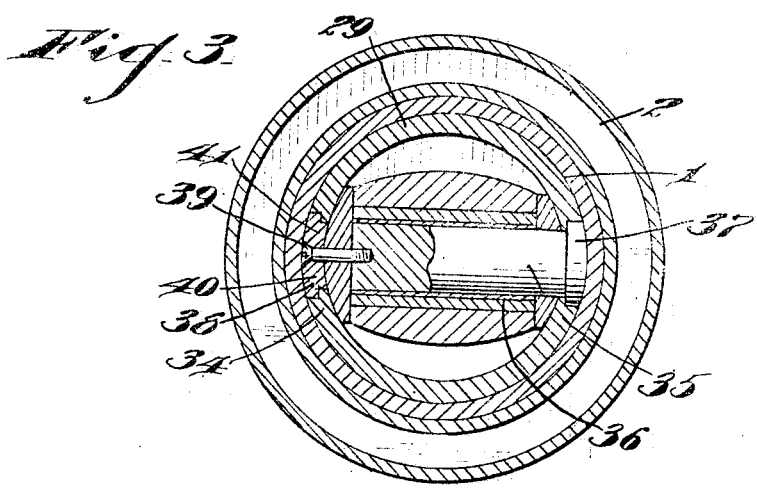
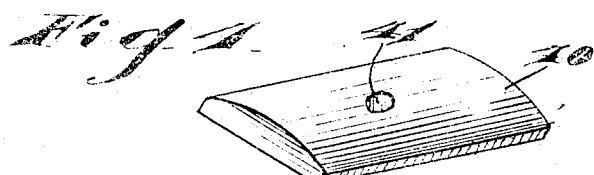

ANTHONY DUFFY, OF PHILADELPHIA, PENNSYLVANIA.

INTERNAL-COMBUSTION ENGINE.

951,181.

Specification of Letters Patent. Patented Mar. 8, 1910.

Application filed October 16, 1909. Serial No. 522,922.

*To all whom it may concern:*

Be it known that I, ANTHONY DUFFY, a citizen of the United States, residing at Philadelphia, in the county of Philadelphia, and State of Pennsylvania, have invented certain new and useful Improvements in Internal-Combustion Engines, of which the following is a specification.

My invention relates to improvements in internal combustion engines, and more particularly to an improved construction of piston with improved mounting for the connecting rod, whereby the parts may be adjusted to take up wear.

With these and other objects in view, the invention consists in certain novel features of construction, and combinations and arrangements of parts as will be more fully hereinafter described and pointed out in the claims.

In the accompanying drawings, Figure 1, is a view in longitudinal section of the cylinder taken on the line 1—1 of Fig. 2. Fig. 2, is a view in cross section on the line 2—2 of Fig. 1. Fig. 3, is a view in cross section on the line 3—3 of Fig. 1, and Fig. 4, is an enlarged perspective view of the spacing washer 40.

1 represents the engine cylinder, which is inclosed in a water jacket 2, and secured upon any suitable frame work 3. 4 represents the hollow water jacketed head of the cylinder secured by bolts 5 as shown.

The head 4 is provided with three tubular passages 6, 7 and 8 respectively, to receive the inlet pipe 9, the exhaust pipe 10, and the spark plug 11 respectively. The inlet pipe 9 and exhaust pipe 10 are secured to the head by means of screws or bolts 12, the inlet pipe 9 being preferably smaller than exhaust pipe 10. These pipes 9 and 10 are of elbow form, and are internally beveled at their inner ends forming valve seats 13.

14 is the inlet valve and 15 the outlet valve, both of said valves having stems 16, which project through tubular guides 17 in the pipes, and having disks 18 secured thereon near their upper ends, and coiled springs 19 are positioned between said disks 18 and the pipes so as to exert a normal pressure against the disks to hold the valves against the seats. These valve stems are located in the path of movement of cams 20 and 21 respectively, on a countershaft 22, the cam 20 constructed to operate the inlet valve 14, and the cam 21 the outlet valve 15, as will more fully hereinafter appear. This countershaft 22 is driven by a pair of miter gears 23, one of which is secured upon a shaft 24, and has a large gear 25 secured thereon. This gear 25 is driven by a smaller gear 26 on the crank-shaft 27, the latter connected by the connecting rod 28 with the piston 29 in cylinder 1. The gear 25 is of twice the diameter and twice the number of teeth as gear 26, so that it requires two revolutions of crank-shaft 27 to turn countershaft 22 a single revolution.

The piston 29 is provided on its inner face with a circular extension or ring 30, having an annular groove 31, in which a packing 32 is located, and this groove 31 is connected with the interior of the ring by means of a series of perforations so that the exploded gases behind the piston will pass through the perforations 33 into the groove 31, and exert an outward pressure on the packing 32 to hold it tightly against the inner face of the cylinder and insure a perfectly tight piston at all times.

The piston 29 adjacent its outer end is provided with openings 34 to receive the journal pin 35, upon which the connecting rod 28 is mounted, and is provided with a suitable bushing 36 around said journal pin. The openings 34 are enlarged at their ends to receive in one of them the head 37 of the pin 35, while the other opening receives a removable head 38, which is secured by a screw 39 with pin 35.

Between the head 38 and the pin 35, and also between the connecting rod and the inner face of the piston, a spacing block or washer 40 is positioned. This block is shown most clearly in Fig. 4, and is made with a curved face to conform to the curvature of the piston, and with a flat face to lie flush against the pin 35 and the connecting rod. This spacing block or washer 40 is also provided with an opening 51 to permit the screw 39 to pass therethrough, and into a threaded socket in the end of pin 35. When the parts become worn so as to cause a lateral wabbling, due to lateral thrust this washer 40 may be removed, and another washer inserted in its place, to compensate for the wear, thus rendering it easy to tighten up the connection between the connecting rod and the piston at any time by any one of average intelligence.

The operation is as follows: With the parts as shown in Fig. 1, an explosion has just taken place, and piston 29 has been forced to the end of its stroke, the cam 21 being in position to open the valve 15. As the piston starts on its up stroke, cam 21 will open valve 15, and the exploded gases will be forced through the exhaust port 10. When the piston completes its stroke, cam 21 will have passed the exhaust valve rod, and cam 20 will engage the inlet valve rod, so that as the piston moves downward, the inlet valve will be held open, so that the explosive mixture may enter the cylinder back of the piston. The next up stroke of the piston serves to compress the exploded mixture, and when the piston reaches the end of this stroke, the spark plug 11 will explode the mixture behind the piston, and drive the piston downward to the position shown in Fig. 1, when the operation above described will be repeated.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In an internal combustion engine, the combination with a cylinder and a crank-shaft, of a piston in the cylinder, a journal pin in said piston comprising two sections, said sections supported on opposite sides of the piston, a connecting rod connected at one end to the crank-shaft, and at its other end located on one of said pin sections, a spacing washer between said pin sections, and between one side of the connecting rod and the piston, and a screw passed through one of said pin sections, through said spacing block and connecting the pin sections together.

2. In an internal combustion engine, the combination with a cylinder and a crank-shaft, of a piston in the cylinder, a journal pin in said piston comprising two sections, said sections supported on opposite sides of the piston, a connecting rod connected at one end to the crank-shaft, and at its other end located on one of said pin sections, a spacing washer between said pin sections and between one side of the connecting rod and the piston, and a screw passed through one of said pin sections, through said spacing block and connecting the pin sections together, and said block or washer having one flat face and one curved face, substantially as set forth.

3. In an internal combustion engine, the combination with a cylinder, of a piston in the cylinder, a journal pin in said piston comprising two sections, a connecting rod projecting into the piston and having a bearing to receive one of said pin sections, a spacing washer inserted between the wall of said piston and connecting rod, and between said sections of journal pin, and a connecting device passed through one of said sections of the journal pin and through the spacing washer and through the other section of the journal pin.

4. In an internal combustion engine, the combination with a cylinder and a cylindrical piston in the cylinder, of a connecting rod having a bearing at one end, a journal pin comprising two sections, both sections mounted in the piston, one of said sections longer than the other and projecting through the bearing of the connecting rod, a spacing washer having a curved face positioned against the inner face of the piston, and a flat face positioned against the connecting rod, and the end of the long journal pin section, and a screw passed through the shorter pin section through the spacing washer and screwed into the end of the longer journal pin section.

In testimony whereof I have signed my name to this specification in the presence of two subscribing witnesses.

ANTHONY DUFFY.

Witnesses:
S. W. FOSTER,
R. H. KRENKEL.